United States Patent
Malenfant

(10) Patent No.: US 10,076,711 B2
(45) Date of Patent: Sep. 18, 2018

(54) REMOTE RENDERING SERVER WITH BROADCASTER

(71) Applicant: SQUARE ENIX HOLDINGS CO., LTD., Tokyo (JP)

(72) Inventor: Philippe Malenfant, Brossard (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 242 days.

(21) Appl. No.: 14/854,284

(22) Filed: Sep. 15, 2015

(65) Prior Publication Data

US 2017/0072323 A1    Mar. 16, 2017

(51) Int. Cl.
| | |
|---|---|
| A63F 13/00 | (2014.01) |
| A63F 13/86 | (2014.01) |
| H04L 29/06 | (2006.01) |
| A63F 13/87 | (2014.01) |
| A63F 13/85 | (2014.01) |
| A63F 13/355 | (2014.01) |
| A63F 13/5252 | (2014.01) |
| A63F 13/352 | (2014.01) |

(52) U.S. Cl.
CPC ............ *A63F 13/86* (2014.09); *A63F 13/352* (2014.09); *A63F 13/355* (2014.09); *A63F 13/5252* (2014.09); *A63F 13/85* (2014.09); *A63F 13/87* (2014.09); *H04L 65/403* (2013.01); *H04L 65/4076* (2013.01); *H04L 67/38* (2013.01); *A63F 13/00* (2013.01)

(58) Field of Classification Search
CPC .......... A63F 13/00; A63F 13/12; A63F 13/85; A63F 13/86; A63F 13/87
USPC ................................................ 463/1, 40, 42
See application file for complete search history.

(56) References Cited

U.S. PATENT DOCUMENTS

| | | |
|---|---|---|
| 5,558,339 A | 9/1996 | Perlman |
| 7,458,894 B2 | 12/2008 | Danieli et al. |
| 7,632,186 B2 | 12/2009 | Spanton et al. |
| 8,025,572 B2 | 9/2011 | Spanton et al. |

(Continued)

OTHER PUBLICATIONS

U.S. Appl. No. 14/854,232 to Jacob Navok et al., filed Sep. 15, 2015.

(Continued)

*Primary Examiner* — William H McCulloch, Jr.
*Assistant Examiner* — Chase Leichliter
(74) *Attorney, Agent, or Firm* — Greenblum & Bernsteing, P.L.C.

(57) ABSTRACT

Methods, systems, devices, and media for broadcasting a network game to a plurality of game spectators are provided. Game players are connected to a game server for participating in the network game. The game server executes a game program and generates game information for progressing the network game. A rendering server receives the game information from the game server, generates a player game screen for each of the game players, and generates a spectator game screen for the game spectators. The player game screen is transmitted to each of the game players for display by the game players. The spectator game screen is transmitted to a broadcaster, and the broadcaster transmits the spectator game screen to a display interface via a network. The display interface is accessible by each of the game spectators for viewing the spectator game screen.

17 Claims, 11 Drawing Sheets

(56) References Cited

U.S. PATENT DOCUMENTS

| | | | |
|---|---|---|---|
| 8,235,817 B2 | 8/2012 | Zalewski | |
| 2006/0105299 A1 | 5/2006 | Ferris et al. | |
| 2012/0086631 A1* | 4/2012 | Osman | A63F 13/655 345/156 |
| 2013/0324244 A1 | 12/2013 | Mikhailov et al. | |
| 2013/0324245 A1 | 12/2013 | Harvey et al. | |
| 2014/0031121 A1 | 1/2014 | Kern et al. | |
| 2014/0113718 A1 | 4/2014 | Norman et al. | |
| 2014/0171194 A1 | 6/2014 | Vago et al. | |
| 2014/0179427 A1 | 6/2014 | Miura et al. | |
| 2014/0235311 A1 | 8/2014 | Weising et al. | |
| 2014/0243098 A1 | 8/2014 | Yong et al. | |
| 2014/0248960 A1 | 9/2014 | Zalewski | |
| 2014/0274368 A1 | 9/2014 | Cotter | |
| 2014/0302906 A1 | 10/2014 | St-Amand | |
| 2014/0349746 A1 | 11/2014 | Boudville | |
| 2015/0100461 A1 | 4/2015 | Baryakar et al. | |
| 2015/0119142 A1 | 4/2015 | Abbott et al. | |
| 2015/0121437 A1 | 4/2015 | Tan | |
| 2015/0127774 A1 | 5/2015 | Hitomi et al. | |
| 2015/0133218 A1 | 5/2015 | Yudintsev | |
| 2015/0165320 A1 | 6/2015 | Perlman et al. | |
| 2015/0258438 A1* | 9/2015 | Tait | A63F 13/355 463/31 |
| 2017/0001111 A1* | 1/2017 | Willette | A63F 13/30 |
| 2017/0001112 A1* | 1/2017 | Gilmore | A63F 13/30 |
| 2017/0001122 A1* | 1/2017 | Leung | A63F 13/86 |
| 2017/0003740 A1* | 1/2017 | Verfaillie | G06F 3/013 |
| 2017/0003784 A1* | 1/2017 | Garg | A63F 13/87 |
| 2017/0006322 A1* | 1/2017 | Dury | H04N 21/254 |
| 2017/0011554 A1* | 1/2017 | Burba | A63F 13/5255 |
| 2017/0072322 A1* | 3/2017 | Navok | A63F 13/86 |
| 2017/0072324 A1* | 3/2017 | Navok | A63F 13/86 |

OTHER PUBLICATIONS

U.S. Appl. No. 14/854,312 to Jacob Navok et al., filed Sep. 15, 2015.

Shea et al., "Cloud gaming: architecture and performance," Network, IEEE 27.4 (2013): 16-21. Available at: http://www.sfu.ca/~rws1/papers/Cloud-Gaming-Architecture-and-Performance.pdf.

"How video gamers will be able to play in the cloud without guzzling gigabytes," ScienceDaily®, sciencedaily.com, May 20, 2015. Available at: http://www.sciencedaily.com/releases/2015/05/150520134633.htm.

Kim et al., "Multi-view rendering approach for cloud-based gaming services," (2011). Available at: http://www.thinkmind.org/download.php?articleid=afin_2011_6_10_70040.

Eisert et al., "Remote Rendering of Computer Games," Fraunhofer Institute for Telecommunications, Berlin Germany, Accessed: Jun. 2015. Available at: http://iphome.hhi.de/eisert/papers/sigmap07.pdf.

"SourceTV" developer.valvesoftware.com, Jun. 23, 2014. Available at: https://developer.valvesoftware.com/wiki/SourceTV.

Shea et al., "Towards bridging online game playing and live broadcasting: design and optimization," Proceedings of the 25th ACM Workshop on Network and Operating Systems Support for Digital Audio and Video, ACM, 2015. Available at: http://dl.acm.org/citation.cfm?id=2736089.

Mishira: Video game live streaming has just leveled up!, Readme, gitHub, github.com, Aug. 23, 2014. Available at https://github.com/mishira/mishira/commit/59f5aa47b0360dd9a93ec9faa24d8630d0272908.

\* cited by examiner

REMOTE RENDERING SERVER WITH BROADCASTER

BACKGROUND

1. Field of the Disclosure

The present disclosure generally relates to the field of network gaming. More particularly, the present disclosure relates to various systems, methods, and media for providing spectator viewing and streaming of network games.

2. Background Information

Throughout time, the public has had a viewing interest in, and fascination with, sporting events and competitions. Ancient coliseums and amphitheaters as well as modern stadiums and event venues have consistently attracted interest for viewing physical events and competitions of all sorts.

Recently, electronic gaming has become accepted as a new variety of sport or, more appropriately, an e-sport. The acceptance of gaming as an e-sport has given rise to increasingly larger and more popular gaming events, such as the Evolution Championship Series. These events have further piqued public interest in electronic gaming and have given rise to a larger viewing interest.

Electronic game players have resorted to gamecasting as a means for satisfying the public viewing interest. Gamecasting is an activity during which a game player broadcasts a live stream of his or her own game screen, typically using a screen capture application. The live stream is broadcast via the Internet or other network to enable third parties to view or watch the game play during real-time. While traditional methods of gamecasting have provided a medium for viewing electronic gaming, new and improved methods are desired.

SUMMARY OF THE DISCLOSURE

The present disclosure, through one or more of its various aspects, embodiments, and/or specific features or sub-components, provides, inter alia, various systems, servers, methods, media, and programs for broadcasting a network game to a plurality of spectators.

According to a non-limiting embodiment of the present disclosure, a system for broadcasting a network game to a plurality of spectators is provided. The system includes a game server that executes a game program and generates game information for progressing the network game. A plurality of game players are connected to the game server for participating in the network game. A rendering server receives the game information from the game server, generates a player game screen for each of the plurality of game players, and generates a spectator game screen for the plurality of game spectators. The player game screen is transmitted to each of the plurality of game players for display by the plurality of game players. A broadcaster receives the spectator game screen from the rendering server and transmits the spectator game screen to a display interface via a network. The display interface is accessible by each of the plurality of game spectators for viewing the spectator game screen.

According to one aspect of the present disclosure, the spectator game screen is different than the player game screen of each of the plurality of game players.

According to another aspect of the present disclosure, the game information includes information of a dummy player which is not controlled by a participant in the network game, and the rendering server generates the spectator game screen for the dummy player.

According to yet another aspect of the present disclosure, the player game screen is different for each of the plurality of game players.

According to still another aspect of the present disclosure, the spectator game screen includes the player game screen of one of the plurality of game players.

According to an additional aspect of the present disclosure, the broadcaster transmits a stream of spectator game screens to the display interface via the network. The spectator game screens are received from the rendering server. The stream of spectator game screens is accessible by each of the plurality of game spectators via the display interface for viewing the stream of spectator game screens. The spectator game screens of the stream comprise player game screens of at least two of the plurality of game players.

According to another aspect of the present disclosure, the player game screens of the at least two of the plurality of game players are displayed consecutively.

According to yet another aspect of the present disclosure, the broadcaster switches a transmission of the stream from one of the player game screens of a first of the at least two of the plurality of game players to another of the player game screens of a second of the at least two of the plurality of game players in response to a predetermined condition being satisfied in the network game.

According to still another aspect of the present disclosure, the rendering server generates a plurality of spectator game screens for a frame of the network game and transmits the plurality of spectator game screens to the broadcaster. The broadcaster transmits the plurality of spectator game screens to the display interface, with the display interface being accessible by each of the plurality of game spectators for simultaneously viewing the plurality of game screens of the frame of the network game.

According to an additional aspect of the present disclosure, the game server transmits game data to the broadcaster, and the broadcaster receives the game data from the game server and transmits the game data to the display interface via the network for display with the spectator game screen.

According to another aspect of the present disclosure, the game data comprises controller inputs of at least one of the plurality of game players.

According to yet another aspect of the present disclosure, the spectator game screen is different than the player game screen of each of the plurality of game players, the broadcaster transmits the game data for one of the plurality of game players to the display interface via the network for display with the spectator game screen, and the broadcaster transmits the game data for another of the plurality of game players to the display interface via the network for display with the spectator game screen in response to a predetermined event occurring in the network game.

According to still another aspect of the present disclosure, the game data is accessible to less than all of the plurality of game spectators which view the spectator game screen.

According to an additional aspect of the present disclosure, the game data comprises audio data.

According to another non-limiting embodiment of the present disclosure, a method for broadcasting a network game to a plurality of spectators is provided. The method includes the features of executing, by a game server, a game program for progressing the network game. A plurality of game players are connected to the game server for participating in the network game. The method generates, by the game server, game information on a progress of the network game and transmits the game information to a rendering server. The rendering server receives the game information and generates a player game screen for each of the plurality of game players based on the game information. The player game screen is transmitted to each of the plurality of game players for display by the plurality of game players. The rendering server generates a spectator game screen for the plurality of game spectators and transmits the spectator game screen to a broadcaster. The broadcaster receives the spectator game screen and transmits the spectator game screen to a display interface via a network. The display interface is accessible by each of the plurality of game spectators for viewing the spectator game screen.

According to an aspect of the present disclosure, the spectator game screen is different than the player game screen of each of the plurality of game players.

According to another aspect of the present disclosure, the method further includes transmitting, by the broadcaster, a stream of spectator game screens to the display interface via the network. The spectator game screens are received from the rendering server, and the stream of spectator game screens is accessible by each of the plurality of game spectators via the display interface for viewing the stream of spectator game screens. The spectator game screens of the stream comprise player game screens of at least two of the plurality of game players.

According to yet another non-limiting embodiment of the present disclosure, a non-transitory computer readable medium including a program for broadcasting a network game to a plurality of spectators is provided. The program, when executed by at least one processor, causes the at least one processor to perform operations comprising executing, by a game server, a game program for progressing the network game. A plurality of game players is connected to the game server for participating in the network game. The operations further comprise generating, by the game server, game information on a progress of the network game and transmitting the game information to a rendering server. The operations include receiving, by the rendering server, the game information and generating a player game screen for each of the plurality of game players based on the game information. The player game screen is transmitted to each of the plurality of game players for display by the plurality of game players. The operations even further include generating, by the rendering server, a spectator game screen for the plurality of game spectators and transmitting the spectator game screen to a broadcaster, and receiving, by the broadcaster, the spectator game screen and transmitting the spectator game screen to a display interface via a network. The display interface is accessible by each of the plurality of game spectators for viewing the spectator game screen.

According to an aspect of the present disclosure, the spectator game screen is different than the player game screen of each of the plurality of game players.

According to another aspect of the present disclosure, the operations further comprise transmitting, by the broadcaster, a stream of spectator game screens to the display interface via the network. The spectator game screens are received from the rendering server, and the stream of spectator game screens is accessible by each of the plurality of game spectators via the display interface for viewing the stream of spectator game screens. The spectator game screens of the stream comprise player game screens of at least two of the plurality of game players.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure provides various broadcast systems, devices, methods, media, and programs for broadcasting a program to a plurality of spectators.

Figure 1:
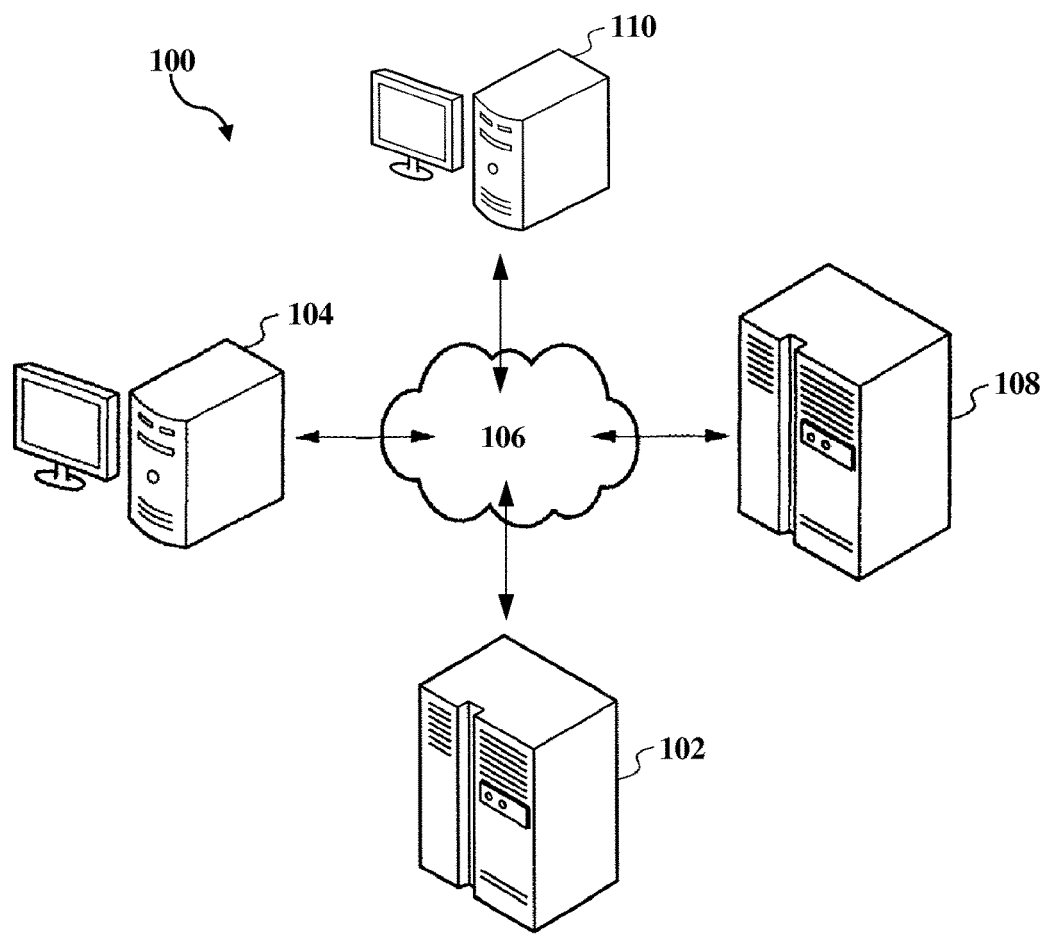
FIG. 1 shows an exemplary system for broadcasting a network game to a plurality of game spectators, according to an aspect of the present disclosure.

An exemplary embodiment of a broadcast system is generally shown in FIG. 1 at 100. The broadcast system 100 includes a game system 102 to which at least one game player 104 is connected via a network 106. The game system 102 generates a player game screen for the game player 104 and also generates a spectator game screen. The game system 102, itself, broadcasts the spectator game screen to a display interface 108 via the network 106, whereupon at least one game spectator 110 may access the display interface 108 via the network 106 to view the spectator game screen.

The game system 102 of FIG. 1 includes a broadcaster that generates and transmits the spectator game screen. In this regard, the broadcaster is a server-side broadcaster. As a result, the spectator game screen is not limited to comprising the player game screen of the game player 104, but rather, may comprise any view of a game environment such as, but not limited to, a global view. Also, since the spectator game screen is generated by the game system 102, the spectator game screen is not limited to comprising a single view, such as the player game screen of traditional broadcasting applications. Even further, the spectator game screen is not limited by the information which may be displayed therein or in connection therewith. For example, the spectator game screen may include game information regarding a plurality of game players, which is not feasible with traditional, player-side broadcasting applications. The spectator game screen may also include game information which is not readily apparent to player-side game screens. The spectator game screen may include, for example, inputs and input-combinations of game players such that the spectator game screen may function as a teaching or learning application. Still further to the above, the spectator game screen may not be limited by any graphics processing or display capabilities of the game player 104, but rather, is provided in accordance with the capabilities of the game system 102. Of course, the above-described features and advantages are not limiting or exhaustive. Additional features and advantages of the broadcast system 100 will be apparent from the following description and embodiments.

Accordingly, in view of the foregoing, the present disclosure, through one or more of its various aspects, embodiments, and/or specific features or sub-components, is thus intended to bring out one or more of the advantages as specifically discussed above and noted below.

Figure 2:
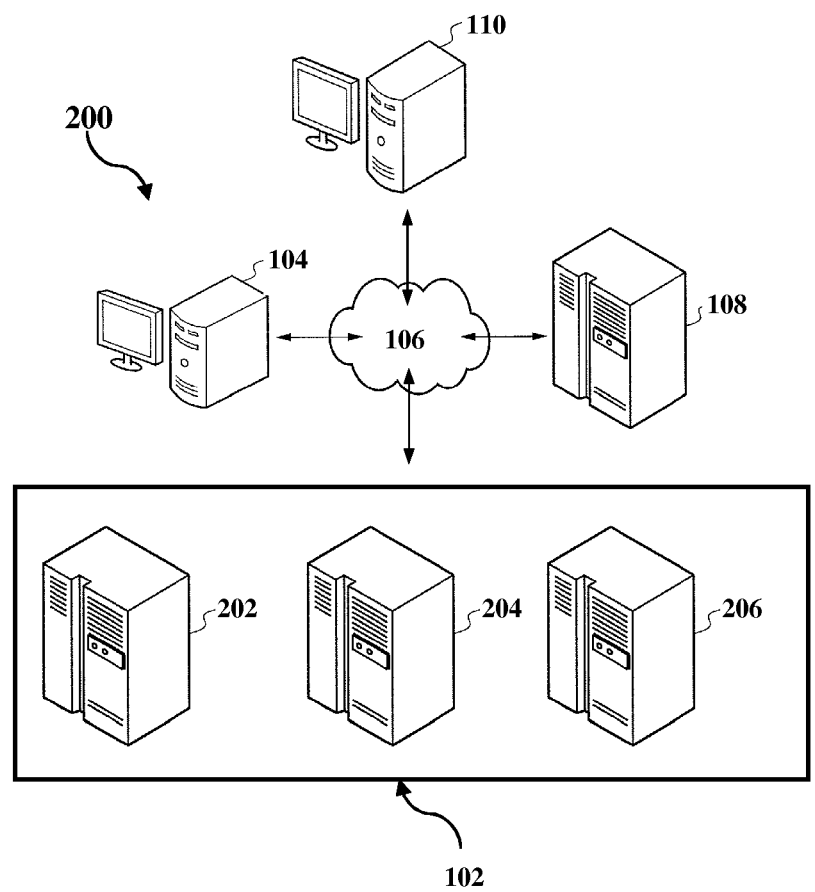
FIG. 2 shows a further exemplary system for broadcasting a network game to a plurality of game spectators, according to an additional aspect of the present disclosure.

FIG. 2 shows a further embodiment of the broadcast system 100 of FIG. 1. The broadcast system of FIG. 2 is generally shown at 200. In the broadcast system 200, the game system 102 includes a game server 202, a rendering server 204, and a broadcaster 206.

The network 106 may be, but is not limited to, a local area network, a wide area network, the Internet, a telephony network, or any other network commonly known and understood in the art. The network 106 is shown in FIG. 2 as being a wireless network. However, those skilled in the art appreciate that the network 106 may additionally or alternatively comprise a wired network.

The service is generally described herein as being a network game provided by the game server 102. In this regard, the network game may be a multiplayer type network game or a single player type network game. The network game may be an action game, a shooter game, an adventure game, a role-playing game, a simulation game, a strategy game, or any other type of game generally known and understood in the art. Of course, the service is not limited to being a network game and may be any other service which is provided via a network such as, but not limited to, a music program, an art program, an animation program, etc.

The game player 104 and the game spectator 110 are each shown in FIG. 2 in singular form. Nevertheless, it is to be known and understood that the broadcast system 200 may comprise a plurality of game players and a plurality of game spectators. In this regard, the game player 104 and the game spectator 110 are generally described hereinafter in plural forms, although those of ordinary skill in the art appreciate that the singular forms may generally be used interchangeably. Also, while the game players 104 and game spectators 110, or game player 104 and game spectator 110, are described as being "players" and "spectators," it should be appreciated that the game players 104 and game spectators 110 are not limited to being individuals but may refer to a game client, apparatus, or device, in singular and plural forms. The game players 104 and game spectators 110 may each be any entity or device which connects with the game server 102 or the display interface 108 via the network 106. The game players 104 and game spectators 110 are described in more detail below.

The game server 202, the rendering server 204, and the broadcaster 206 of the game system 102 may be disparate structures which are directly or indirectly connected via any of the networks described herein. In this regard, the structures may be physical, tangible structures. Any combination of these structures may be integral or non-integral with one another. They may also comprise non-tangible structures in further embodiments of the present disclosure. For example, the broadcaster 206 may be implemented via software and included within either of the game server 202, the rendering server 204, or a combination thereof.

The game server 202 executes and manages a game processing program for progressing the network game, instructs the rendering server 204 to perform an image rendering process, and exchanges game data with the game players 104. In other words, the game server 202 executes and manages game processing of the network game as the service to be provided to the game players 104. For example, the game server 202 manages game information such as a position and direction on a map of a character, or characters, operated by each of the game players 104, and an event, or events, to be provided for each character. The game information may include character information for each of the game players 104 or characters which reflects a current status of the game players 104 or characters. The game information may also include progress information which reflects a current status of the network game or service. Of course, these examples are merely exemplary and are not limiting or exhaustive. The game information may comprise any information which is understood to be associated with a network game or other service.

The game server 202 exchanges the game information with the rendering server 204 and causes the rendering server 204 to generate a player game screen for each of the game players 104. For example, when controller information is received by the game server 202 from any of the game players 104 via the network 106 as a result of an operation input of the game players 104, the game server 202 executes a process of reflecting this information on the character information of the characters of the game players 104. Then, the game server 202 determines at least one rendering object to be rendered on the player game screens based on the character information reflecting the controller information of operation inputs, and transmits a rendering instruction to the rendering server 204.

The rendering server 204 renders the player game screens in accordance with the rendering instruction received from the game server 202, and outputs the generated player game screens directly to the game players 104 or indirectly to the game players 104 via the game server 202. The rendering server 204 can simultaneously form the player game screens for all of the game players 104. Alternatively, the rendering server 204 can sequentially form the player game screens for all of the game players 104. Of course, the rendering server 204 may also perform any combination of simultaneously and sequentially forming the player game screens for the game players 104.

The rendering server 204 executes a game screen rendering process by a graphics processing unit based on information received from the game server 202 for each of the player game screens. The rendering server 204 may execute the game screen rendering process based on identification information of rendering objects contained in each of the player game screens, and detailed information indicating data necessary to render each rendering object. The detailed information necessary to render each rendering object may include, but is not limited to, information indicating the following attribute data: identification information for specifying model data; identification information for specifying texture data; specific information of a rendering program, for example, a shader, to be used; and specific information of data for calculations, for example, the light source intensity, light source vector, and rotation matrix, to be used in the rendering program. The detailed information including the above-listed information may be transmitted from the game server 202 to the rendering server 204, but information to be contained in the detailed information is not limited to the above information. For example, the detailed information may contain any of the above-listed information, and may additionally or alternatively contain any information to be used in the process of rendering a rendering object as generally understood in the art.

Each player game screen, which is rendered by the rendering server 204 in accordance with the transmitted rendering instruction including the rendering object identification information and detailed information, is transmitted to a corresponding one of the game players 104. The game players 104 may directly receive the player game screens from the rendering server 204, or the game players 104 may indirectly receive the player game screens from the rendering server 204 such as by way of the game server 202 or by any other entity. Thus, the game system 102 of FIG. 2 can generate the player game screens corresponding to operation input caused on a client device, and provide the player game screens to the game players 104 via the network 106. As a result, any graphic processing capabilities or requirements for participating in the network game may be minimized or eliminated altogether.

In addition to rendering the player game screens, the rendering server 204 also renders the spectator game screen. The game server 202 similarly exchanges game information with the rendering server 204 for causing the rendering server 204 to render the spectator game screen. The rendering server 204 generally renders the spectator game screen in a same or similar manner as the player game screens. Exemplary embodiments by which the rendering server 204 renders the spectator game screen are discussed in detail below.

The game system 102 of FIG. 2 is shown as including one game server 202 and one rendering server 204. Nevertheless, those of ordinary skill in the art will appreciate that the present disclosure is not limited to this arrangement. For example, it is also possible to allocate one rendering server 204 to a plurality of game servers 202, or to allocate a plurality of rendering servers 204 to a plurality of game servers 202. In further embodiments, the game system 102 may include separate rendering servers 204 for rendering the player game screens and for rendering the spectator game screen. Any rendering servers 204 may be specifically associated with any game server 202 or any of the player game screens and the spectator game screen. Additionally or alternatively, the game server 202 may designate a rendering server 204 or a graphics processing unit of a rendering server 204 to be used to execute a rendering instruction, in accordance with information indicating a number of game screens to be simultaneously or sequentially generated by a rendering server 204 or graphics processing unit of a rendering server 204.

The spectator game screen is transmitted to directly or indirectly to the broadcaster 206 from the rendering server 206. The broadcaster 206 receives and transmits the spectator game screen to the display interface 108. The broadcaster 206 may process, encode, compress, and/or output the stream or scene to the display interface 108 in accordance any known formats and/or teachings commonly understood in the art. In this regard, any image output of the broadcaster 206 may only be limited by the graphic processing capabilities of the rendering server 204, as well as possibly being restricted by any downstream limitations of the display interface 108, game spectators 110, or network 106. Nevertheless, the image output of the broadcaster 206 may be independent of any processing and display capabilities of the game players 104.

The display interface 108 receives the output of the broadcaster 206, with the display interface 108 being accessible by the game spectators 110 for viewing the spectator game screen. The display interface 108 may comprise a server, platform, application, website, or any other interface which is configured to process, decode, and/or broadcast images or video streams via a public, private, or other medium.

Exemplary embodiments of the components of the broadcast system 200 of FIG. 2 are described below with respect to FIGS. 3-5.

Figure 3:
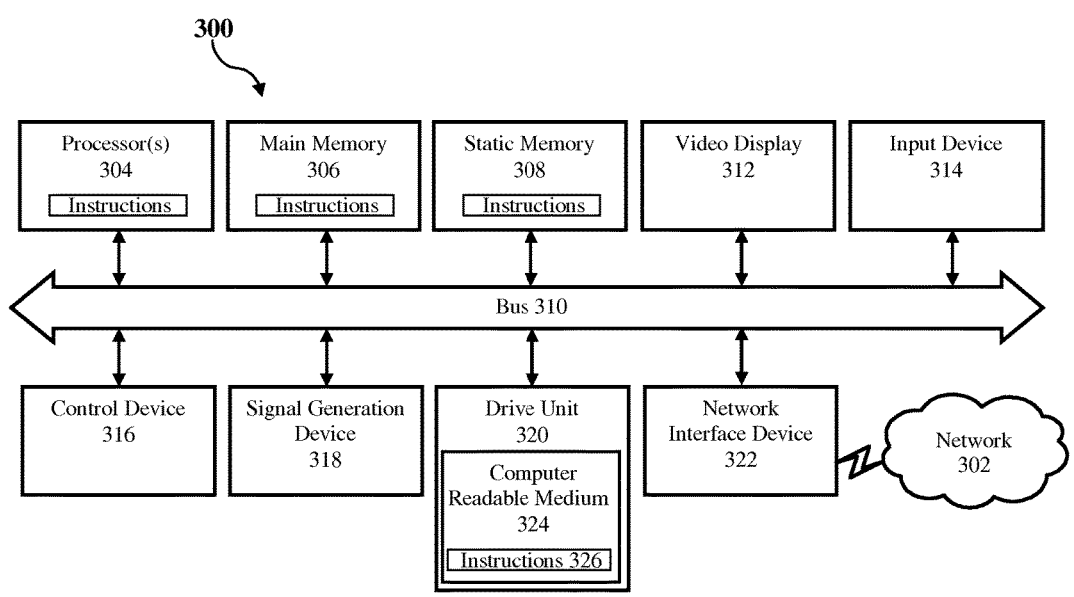
FIG. 3 shows a schematic of an exemplary game player and exemplary game spectator, according to an aspect of the present disclosure.

The game players 104 and the game spectators 110 may each be, for example, a computer system as generally shown at 300 in FIG. 3. The computer system 300 may include a set of instructions that can be executed to cause the computer system 300 to perform any one or more of the methods or computer based functions disclosed herein. The computer system 300 may operate as a standalone device or may be connected, for example, using a network 302, to other computer systems or peripheral devices such as the game system 102 or the display interface 108.

In a networked deployment, the computer system 300 may operate in the capacity of a server or as a client user computer in a server-client user network environment, a client user computer in cloud computing environment, or as a peer computer system in a peer-to-peer (or distributed) network environment. The computer system 300 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 300 may be implemented as, or incorporated into, an automobile or a wearable device, such as, but not limited to, watches, glasses, bracelets, and headsets. The computer system 300 can be incorporated as or in a particular device that in turn is in an integrated system that includes additional devices. In a particular embodiment, the computer system 300 can be implemented using electronic devices that provide voice, video or data communication. Further, while a single computer system 300 is illustrated, the term "system" shall also be taken throughout the present disclosure to include any collection of systems or sub-systems that individually or jointly execute a set, or multiple sets, of instructions to perform one or more computer functions.

As illustrated in FIG. 3, the computer system 300 includes a player processor 304. The player processor 304 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The player processor 304 is an article of manufacture and/or a machine component. The player processor 304 is configured to execute software instructions in order to perform functions as described in the various embodiments herein. The player processor 304 may be a general purpose processor or may be part of an application specific integrated circuit (ASIC). The player processor 304 may also be a microprocessor, a microcomputer, a processor chip, a controller, a microcontroller, a digital signal processor (DSP), a state machine, or a programmable logic device. The player processor 304 may also be a logical circuit, including a programmable gate array (PGA) such as a field programmable gate array (FPGA), or another type of circuit that includes discrete gate and/or transistor logic. The player processor 304 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 300 includes at least one of a player main memory 306 and a player static memory 308. The player main memory 306 and the player static memory 308 can communicate with each other via a player bus 310. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 300 may further include a video display device 312, such as a liquid crystal display (LCD), an organic light emitting diode (OLED), a flat panel display, a solid state display, or a cathode ray tube (CRT). The video display device 312 may be integrated with or physically separate from the components of the computer system 300 described herein.

Additionally, the computer system 300 may include a player input device 314, such as a keyboard/virtual keyboard or touch-sensitive input screen or speech input with speech recognition. The computer system 300 may also include a cursor control device 316, such as a mouse or touch-sensitive input screen or pad, a microphone, etc. The computer system 300 may also include a signal generation device 318, such as a speaker or remote control, a game disk drive unit 320, and a player network interface device 322.

In a particular embodiment, as depicted in FIG. 3, the game disk drive unit 320 may include a game computer-readable medium 324 in which one or more sets of instructions 326, e.g. software, can be embedded. Additionally or alternatively to the game disk drive unit 320, the computer system 300 may comprise any additional storage unit, such as, but not limited to, a solid state storage or other persistent storage, which comprises the computer-readable medium 324. Sets of instructions 326 can be read from the game computer-readable medium 324. Further, the instructions 326, when executed by a processor, can be used to perform one or more of the methods and processes as described herein. In a particular embodiment, the instructions 326 may reside completely, or at least partially, within the player main memory 306, the player static memory 308, and/or within the player processor 304 during execution by the computer system 300.

Figure 4:
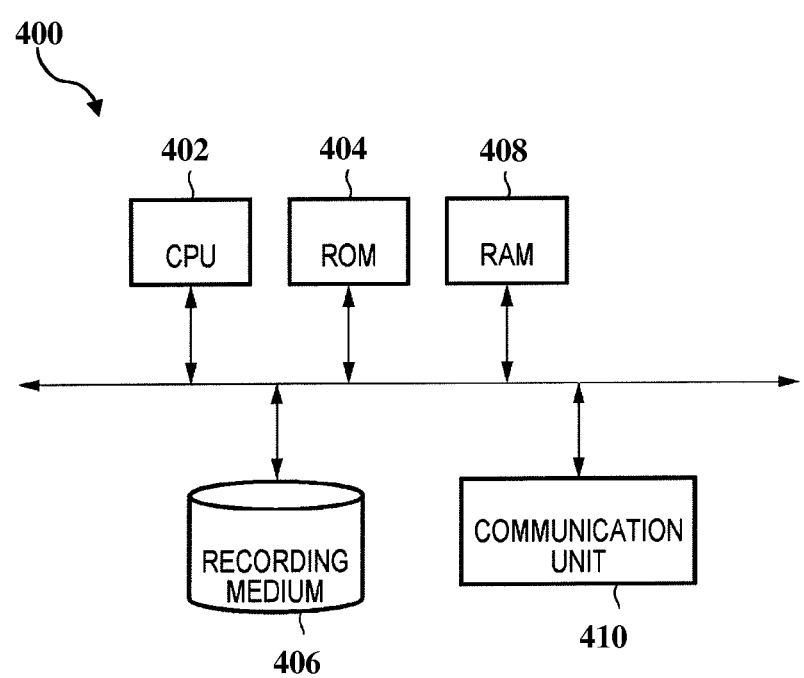
FIG. 4 shows a block diagram of an exemplary game server, according to an aspect of the present disclosure.

FIG. 4 is a block diagram showing an exemplary functional arrangement of the game server 202 according to an embodiment of the present disclosure. The game server 202 may be, for example, a game server system as generally shown at 400 in FIG. 4. However, it is to be appreciated that the game server 202 may also be the same or similar to the computer system 300 of FIG. 3. The game server 202 may comprise any combination of the components of the computer system 300 and the game server system 400.

A game CPU 402 controls the operation of each block of the game server system 400. More specifically, the game CPU 402 reads out a game processing program from, for example, a game ROM 404 or game recording medium 406, expands the program on a game RAM 408, and executes the program, thereby controlling the operation of each block. The game CPU 402 may be the same or similar to the player processor 304 as described with respect to FIG. 3.

The game ROM 404 may be the same or similar to the player main memory 306 of FIG. 3. For example, the game ROM 404 may be a programmable nonvolatile memory. The game ROM 404 stores the game processing program, and may also store other programs. The game ROM 404 also stores information such as a constant required for the operation of each block of the game server 400.

The game RAM 408 may be the same or similar to the player static memory 308 of FIG. 3. For example, the game RAM 408 may be a volatile memory. The game RAM 408 is used not only as a game processing program expansion area, but also as a storage area for temporarily storing, for example, intermediate data output during the operation of each block of the game server 400.

The game recording medium 406 is, for example, a recording device such as an HDD detachable from the center server 400. The game recording medium 406 may be the same or similar to the game disk drive unit 320 or the game computer-readable medium 324 of FIG. 3. In this embodiment, the game recording medium 406 is used as, for example, a database for managing users and client devices using the network game, and a database for managing various kinds of information on the network game, which are required to generate the player game screens to be provided for each connected game player 104 and to generate the spectator game screen to be provided for the game spectators 110.

A game communication unit 410 is a communication interface of the game server system 400. The game communication unit 410 may be the same or similar to the network interface device 322 of FIG. 3. The game communication unit 410 exchanges data with the game players 104, the rendering server 204, and the broadcaster 206. The game communication unit 410 may convert data into a data format complying with any necessary or required communication specifications.

Figure 5:
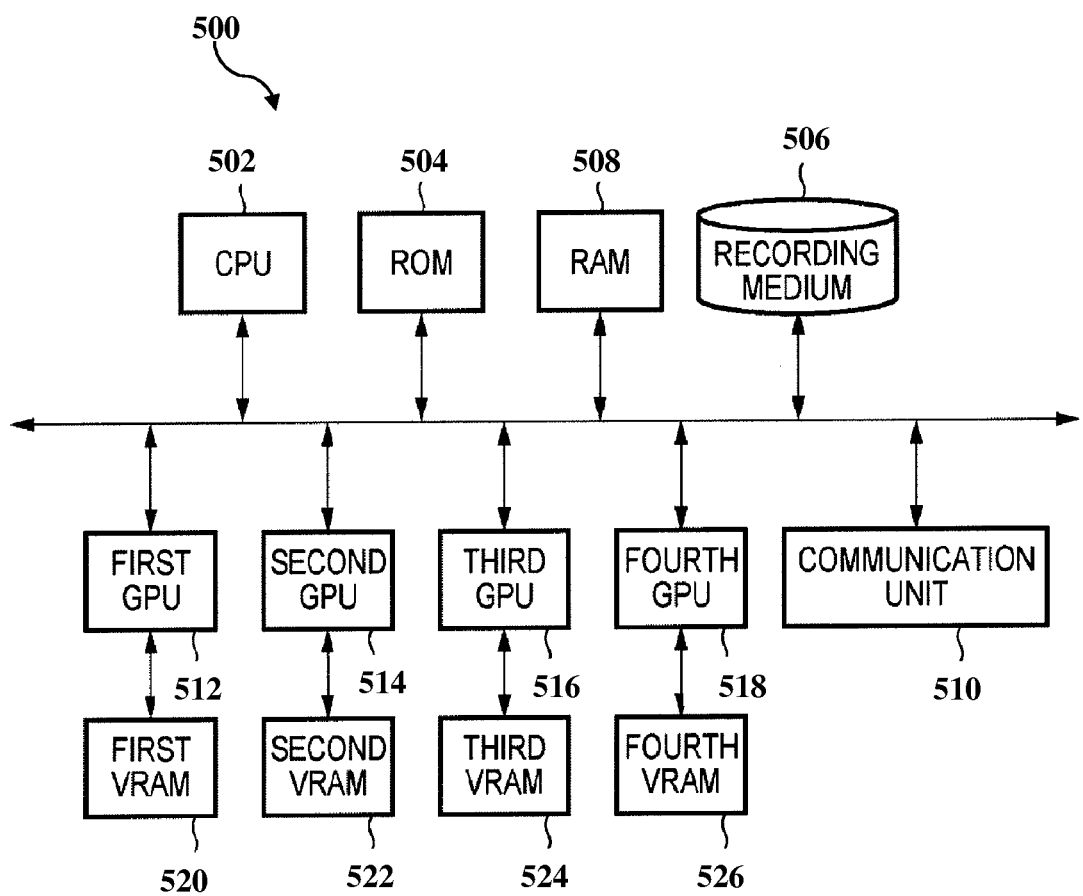
FIG. 5 illustrates a block diagram of an exemplary rendering server, according to an aspect of the present disclosure.

FIG. 5 is a block diagram showing an exemplary functional arrangement of the rendering server 204 according to an embodiment of the present disclosure. The rendering server 204 may be, for example, a rendering server system as generally shown at 500 in FIG. 5. However, it is to be appreciated that the rendering server 204 may also be the same or similar to the computer system 300 of FIG. 3. The rendering server 204 may comprise any combination of the components of the computer system 300 and the rendering server system 500.

A rendering CPU 502 controls the operation of each block of the rendering server system 500. More specifically, the rendering CPU 502 reads out a rendering process operation program stored in a rendering ROM 504 or rendering recording medium 506, expands the program on a rendering RAM 508, and executes the program, thereby controlling the operation of each block. The rendering CPU 502 may be the same or similar to the player processor 304 as described with respect to FIG. 3.

The rendering ROM 504 may be the same or similar to the player main memory 306 of FIG. 3. For example, the rendering ROM 504 may be a programmable nonvolatile memory. The rendering ROM 504 stores the rendering process operation program, other operation programs, and information such as a constant required for the operation of each block of the rendering server system 500.

The rendering RAM 508 may be the same or similar to the player static memory 308 of FIG. 3. For example, the rendering RAM 508 may be a volatile memory. The rendering RAM 508 is used not only as an operation program expansion area, but also as a storage area for temporarily storing, for example, intermediate data output during the operation of each block of the rendering server system 500.

The rendering recording medium 506 is, for example, a recording device such as an HDD detachable from the rendering server system 500. The rendering recording medium 506 may be the same or similar to the game disk drive unit 320 or the game computer-readable medium 324 of FIG. 3. In this embodiment, the rendering recording medium 506 may store the following data to be used to generate the game player screens and the spectator player screens the rendering process: model data; texture data; a rendering program; and data for calculations to be used in the rendering program. Of course, the above-listed data is merely exemplary and not limiting or exhaustive. In additional embodiments, the rendering recording medium 506 may store additional or alternative data without departing from the scope of the present disclosure.

A rendering communication unit 510 is a communication interface of the rendering server system 500. The rendering communication unit 510 may be the same or similar to the network interface device 322 of FIG. 3. The rendering communication unit 510 exchanges data with another apparatus, for example, the rendering server 204 and the broadcaster 206. When transmitting data, the rendering communication unit 510 may convert the data into a data transmission format determined with respect to a transmission network or a transmission destination apparatus, and transmits the data to the transmission destination apparatus. When receiving data, the rendering communication unit 510 may convert received data into an arbitrary data format readable by the rendering server system 500, and store the data in, for example, the rendering RAM 508.

First, second, third, and fourth rendering GPUs 512, 514, 516, and 518 each generate one of the player game screens to be provided for the game players 104 or the spectator game screen to be provided for the game spectators 110. Each rendering GPU 512, 514, 516, and 518 is connected to a video memory, such as first, second, third, and fourth rendering video RAMs (VRAMs) 520, 522, 524, and 526, as a game screen rendering area. Each rendering GPU 512, 514, 516, and 518 may also include a cache memory (not shown). When performing rendering on the connected rendering VRAM 520, 522, 524, and 526, each rendering GPU 512, 514, 516, and 518 expands a rendering object on the cache memory, and writes the mapped rendering object in the corresponding rendering VRAM 520, 522, 524, and 526. FIG. 5 shows one video memory being connected to each graphics processor. However, it is to be known and understood that the number of video memories connected to the graphics processors can be any arbitrary number. Moreover, FIG. 5 shows the rendering server system 500 as including four graphics processors. However, it is also to be known and understood that the graphics processors can be any arbitrary number.

Each of the broadcaster 206 and the display interface 108 may comprise any combination of the components of the computer system 300, the game server system 400, and the rendering server system 500.

An exemplary embodiment of basic network game processing executed on the broadcast system 200 having the arrangement of the game server 202 and the rendering server 204 as described above is generally explained with reference to FIG. 6. The basic network game processing is generally shown at 600 and may be implemented by the game server 202 reading a corresponding processing program and executing the processing program, as described above with respect to FIG. 4.

The network game processing 600 may be started when, for example, the network game begins or the game server 202 is activated, and repetitively executed for each frame of the network game. In the network game processing 600, the game server 202 and the rendering server 204 are described as providing the player game screens for the game players 104. However, as will be evident from the disclosure below, similar processing may also be executed each frame for providing the spectator game screen to the broadcaster 206.

In step S602, the game server 202 determines whether information indicating an operation input caused on any of the game players 104 is received. If the game server 202 determines that the information indicating the operation input is received, the game server 202 advances the process to step S604. If not, the game server 202 advances the process to step S606.

In step S602, the game server 202 updates game information based on the information indicating the operation input on the game players 104, which is received in step S602. For example, the game server 202 determines state information corresponding to a character in the network game, which is an operation target of a user of a corresponding game player 104. The character state information is information of the action and appearance of the character that may be changed by the user's operation, for example, the position (e.g., coordinate information) of the character on the map, the gazing direction of the character, and a character's action. The game server 202 refers to the received operation input information, and updates a parameter that changes by the operation input, among parameters contained in the state information, by the received operation input information. Accordingly, the game server 202 can reflect, in the network game, the information of the operation input performed by any of the game players 104.

In step S606, the game server 202 updates state information of a rendering object as a state management target in the network game, except for the character as an operation target of each of the game players 104. Examples of the rendering object as a state management target in the network game may be a non-player character that is not a target of a user's operation, and a background object such as a landform. A rendering object as a state management target in the network game changes with time or by the action of a character as a user's operation target. In step S606, therefore, the game server 202 updates the state information of a rendering object as a state management target in the network game, in accordance with the elapse of time or the character state information updated in step S604.

In step S608, the game server 202 specifies rendering objects contained in the player game screen provided for each of the game players 104. The rendering objects contained in the player game screens may include a character's rendering object as a user's operation target as identified in S604, and a rendering object as a state management target in the network game as identified in S606. In other words, the game server 202 selects each game player 104 presently connected to the game server 202, and reads information of a player game screen rendering range with which each of the game players 104 is associated. The information of the game screen rendering range may include, for example, camera parameters corresponding to the player game screens.

In step S610, the game server 202 transmits, to the rendering server 204, instructions to render the player game screens to be provided for the game players 104, and causes the rendering server 204 to execute rendering processing. The game server 202 may transmit the instructions for all of the game players 104, or for less than all of the game players 104. The instructions may be simultaneously, sequentially, or serially transmitted. The instructions may include, for each game player 104, identification information for the game player 104, the rendering objects contained in the player game screen, detailed information set for each of the rendering objects contained in the player game screen, state information of each rendering object contained in the player game screen, and information of the rendering range and display setting of the player game screen.

Figure 6:
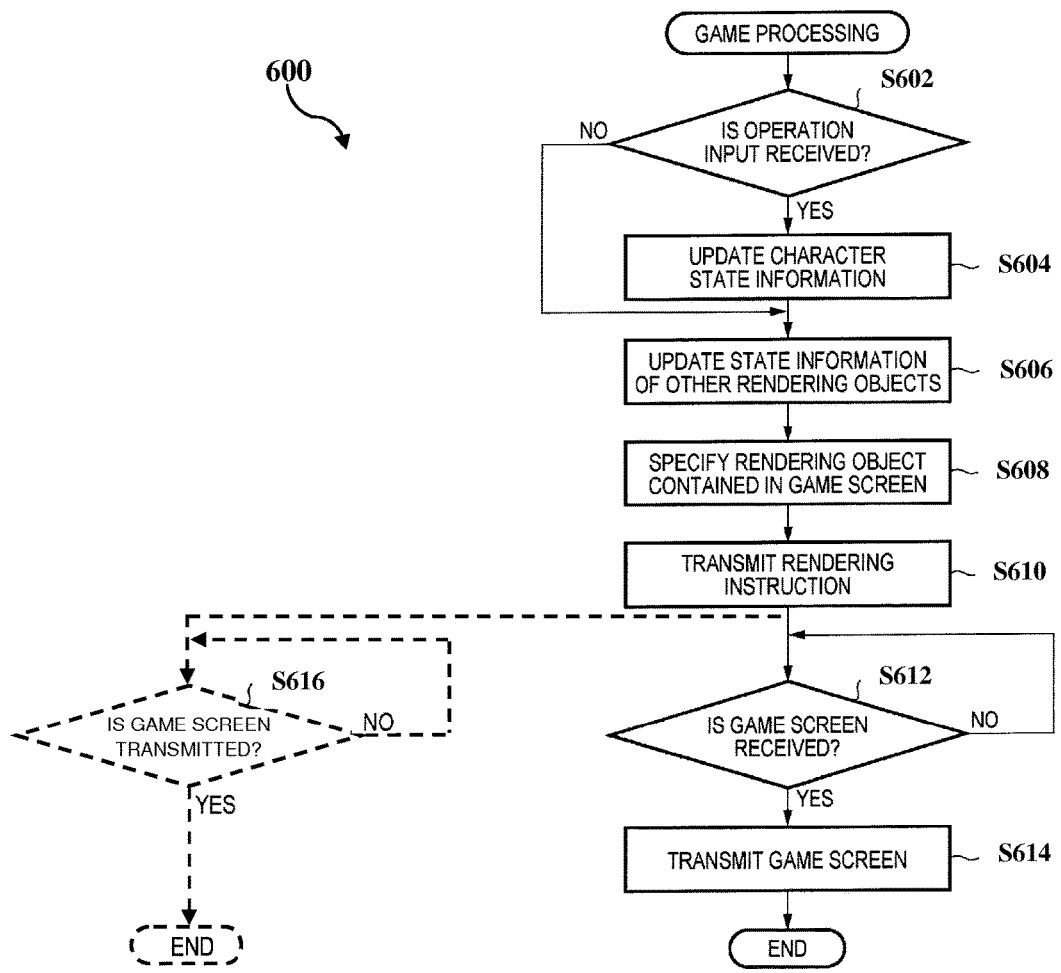
FIG. 6 illustrates a flowchart of an exemplary network game process, according to an aspect of the present disclosure.

In an embodiment of the network game processing 600 as shown in FIG. 6, at step S612, the game server 202 may determine whether the player game screens generated by the rendering server 204 in accordance with the rendering instruction are received from the rendering server 204. If it is determined that the player game screens are received, the game server 202 advances the process to step S614 and transmits the player game screens to the game players 104. If the player game screens are not received at step S612, the game server 202 waits until the player game screens are received. The game server 202 may wait until all of the player game screens are received, such that the player game screens of the game players 104 are transmitted at a same time. Alternatively, the game sever 202 may transmit each player game screen as it is received.

In an alternative embodiment of the network game processing 600 as shown in FIG. 6, the rendering server 204 may transmit the player game screens to the game players 104. In this regard, the game server 202 may determine whether the player game screens have been transmitted at step S616. For example, the game server 202 may determine whether the player game screens have been transmitted by receiving a confirmation from the rendering server 204. In even further embodiments of the present disclosure in which the rendering server 204 transmits the player game screens to the game players 104, the game server 202 does not receive any confirmation and the network game processing 600 may end after step S610. In accordance with the above embodiments, the rendering server 204 may also transmit the player game screens to the game players 104 at a same time or as the player game screens are rendered.

The network game processing 600 of FIG. 6 is merely an exemplary method of a configuration of the game server 202 and the rendering server 204. Additional and alternative embodiments of the network game processing 600 may be provided without departing from the scope of the present disclosure. The shown embodiment is merely exemplary and should not be considered limiting.

Figure 7:
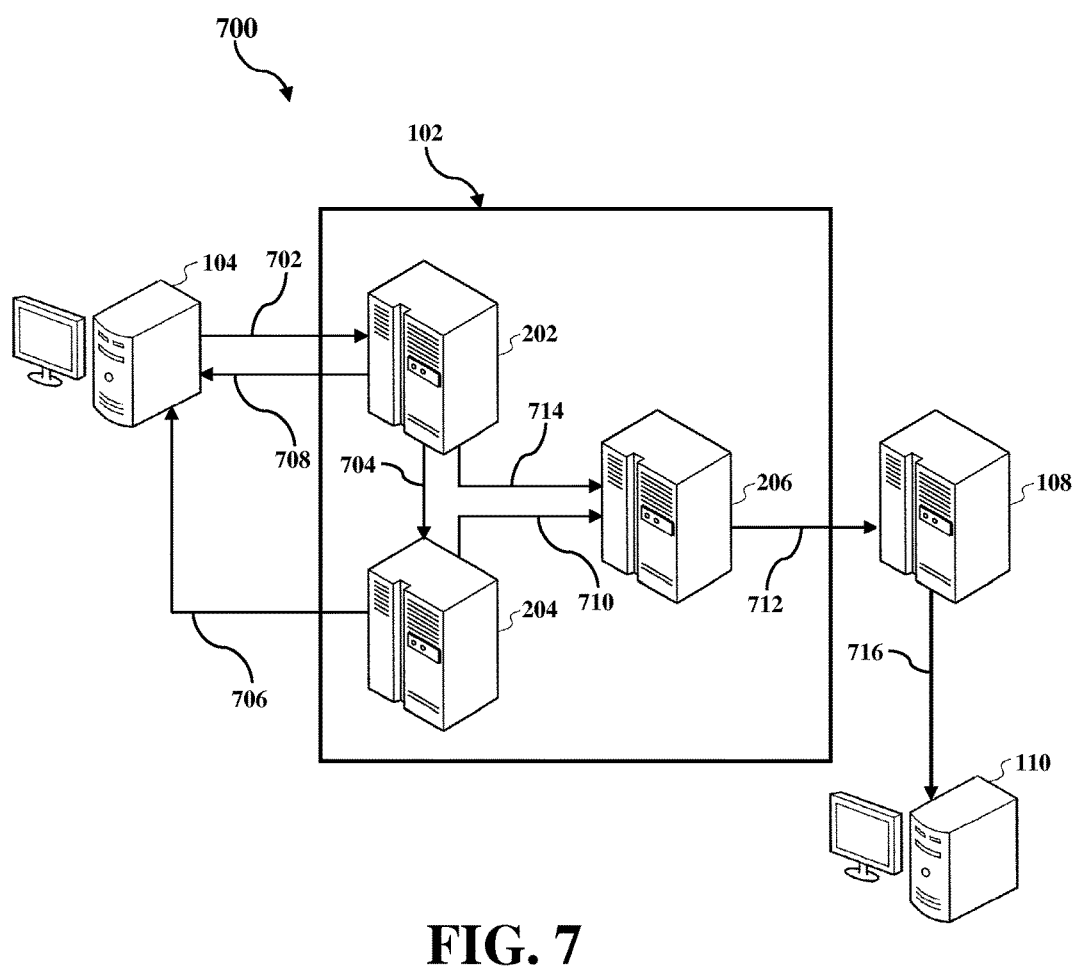
FIG. 7 illustrates a schematic of an exemplary system for broadcasting a network game to a plurality of game spectators, according to an aspect of the present disclosure.

FIG. 7 shows a schematic of the broadcast system 200 of FIG. 2 at 700. The game server 202 executes a game program and generates game information for progressing the network game. The game players 104 are connected to the game server 202 for participating in the network game. The game server 202 receives controller input information 702 from the game players 104, updates the game information based on the controller input information 702, and issues a rendering instruction 704 to the rendering server 204 as generally discussed above.

The rendering instruction 704 may comprise an instruction to render a single player game screen for one of the game players 104, or the rendering instruction 704 may comprise an instruction to render the player game screens for multiple ones of the game players 104. In this regard, the rendering server 204 may render a different player game screen for each of the game players 104. Alternatively, the rendering server 204 may render a same player game screen for multiple ones of the game players 104. For example, when the network game includes a group of characters which cooperate as a party, the rendering server 204 may render a same player game screen for the game players 104 which control the characters of the party. In any event, the rendering server 204 is configured to render a plurality of player game screens for the game players 104 based on the rendering instruction 704 received from the game server 202.

The rendering server 204 receives the rendering instruction 704, including the necessary game information, from the game server 202 and generates the player game screens for the game players 104. The player game screens are transmitted to the game players 104 as video information 706 for display by the game players 104. In the embodiment of the present disclosure shown in FIG. 7, the rendering server 204 provides the video information 706 directly to the game players 104. The rendering server 204 may transmit the video information 706 to the game players 104 via the network 106 (not shown). The video information 706 may be transmitted to each of the game players 104 as a unicast transmission or communication. The game server 202 may separately provide audio information 708 to the game players 104. The game server 202 may also transmit the audio information 708 to the game players 104 via the network 106 (not shown). The audio information 708 may also be transmitted to each of the game players 104 as a unicast transmission or communication. Of course, those of ordinary skill in the art appreciate that, in alternative embodiments of the present disclosure as generally discussed with respect to FIG. 6, the rendering server 204 may provide the video information 706 to the game server 202, whereupon the game server 202 provides the video information 706 and the audio information 708 to the game players 104.

The rendering instruction 704 provided by the game server 202 to the rendering server 204 may further include an instruction for generating or rendering a spectator game screen. The spectator game screen is generated or rendered such that the game spectators 110 may watch or view the network game without participating therein. The game spectators 110 do not participate in the network game or control any character or aspect of the network game. In this regard, the game spectators 110 are not connected to the game server 202 or the game system 102, and they do not receive any game information directly from the game server 202 or the game system 102. The game information regarding the network game is only accessible to the game spectators 110 by means of the display interface 108. The spectator game screen may be provided to the game spectators 110 as a multicast transmission or communication.

The spectator game screen may be managed by the game server 202 and controlled via the rendering instruction 704. In an embodiment of the present disclosure, the game server 202 may manage the spectator game screen by executing a game process as generally shown at 800 in FIG. 8. That is, the network game may be initialized at step S802. The network game may be initialized when the network game is started or when the game server 202 is activated. After initialization, the game server 202 may determine whether a spectator mode of the network game is enabled at step S804. If the spectator mode is enabled, the game server 202 may create a dummy player or fake client which is not controlled by any of the game players 104 at step S806. The game server 202 may create and manage the dummy player in a database in a same or similar manner as the game players 104. After creation of the dummy character at step S806, game processing of the network game is resumed at step S808 in accordance with normal game processing, for example, as described with respect to FIG. 6.

Figure 8:
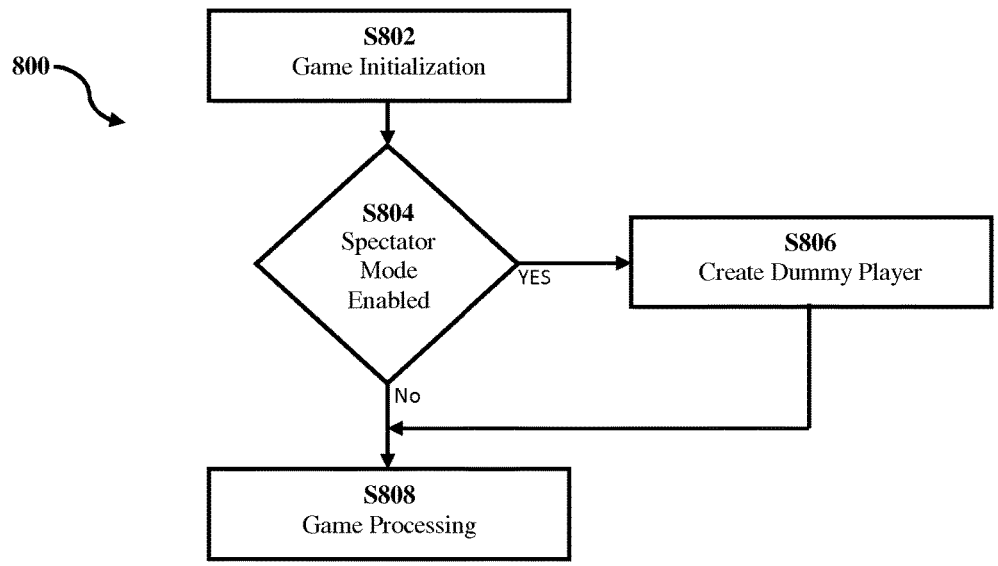
FIG. 8 illustrates a flowchart of an exemplary game process for creating a dummy player for generating a spectator game scream, according to an aspect of the present disclosure.

According to the game process 800 of FIG. 8, the game server 202 manages the spectator game screen as corresponding to the dummy player. As a result, the game server 202 may transmit a similar, or same, rendering instruction 704 to the rendering server 204 for generating the spectator game screen in correspondence with the dummy player as if transmitting the rendering instruction 704 to the rendering server 204 for generating the player game screens of the game players 104. In other words, the rendering instruction 704 for generating the spectator game screen need not be distinguishable, different, or separate from the rendering instruction 704 for generating the player game screens. Thus, any physical structure or functionality of the rendering server 204 need not be altered or modified for generating the spectator game screen.

The game server 202 may create the dummy player at step S806 in correspondence with a fixed reference point in the network game. That is, the game server 202 may create the dummy player as having a fixed position (e.g., coordinate information) on a game map or in a game space or game environment. The game server 202 may additionally or alternatively create the game character as having a fixed gazing direction or viewing angle. According to such embodiments, the game server 202 would not need to perform any processing at S602 and S604 of FIG. 6. That is, the game server 202 not determine whether any controller input information 702 is received from the dummy player, as the dummy player is not controlled by any of the game players 104 at step S806. The game server 202 would also not need to update any character state information for the dummy player, as the position and gazing direction of the dummy player are fixed. The game server 202 may include a default setting for the dummy player whereby the game server 202 does not executing any processing pursuant to step S602 and/or S604 of the game processing 600 of FIG. 6.

In further embodiments of the present disclosure, the game server 202 may create the dummy player as having a fixed position (e.g., coordinate information) on the game map or in the game space or game environment, while having a variable gazing direction or viewing angle. The variable viewing angle or direction may be configured in accordance with a predetermined pattern or based on predetermined rules. For example, the predetermined pattern may be set to continuously pan the game space or game environment from a left-to-right direction, or vice-versa, in a sweeping manner. The predetermined rules may be set, for example, such that the viewing angle or direction follows a closest character or a winning character. The predetermined rules may additionally or alternatively be set based on a priority of events in the network game. For example, viewing a battle may take precedence over viewing a conversation. Of course, the above examples are merely exemplary and are not limiting or exhaustive. In such embodiments in which the gazing direction or viewing angle of the dummy character is variable, the game server 202 may perform processing pursuant to step S604 of the game processing 600 of FIG. 6 to update the character state information of the dummy character.

In even further embodiments of the present disclosure, the game server 202 may create the dummy player as having a variable position (e.g., coordinate information) on the game map or in the game space or game environment, while having either a fixed or variable gazing direction or viewing angle. The variable position of the dummy character may be configured to move throughout the game space or the game environment in accordance with a predetermined pattern or in association with predetermined events or conditions. The predetermined pattern may be repetitive or arbitrary to enhance variety and spectator interest. The predetermined events or conditions may include being offset a predetermined distance from a position of any of the game players 104, such as a winning player. The predetermined events or conditions may also include events in the network game, such as battles or conversations. In this regard, the dummy character may be configured to follow the events based on a priority of events. For example, the dummy character may be configured to follow battle events in priority to conversations. Once again, those of ordinary skill in the art will appreciate that the above examples are exemplary and are not limiting or exhaustive. In such embodiments in which the position of the dummy character is variable, the game program may cause the game server 202 to receive the movements of the dummy character as the controller input information 702 pursuant to step S602 of the game processing 600 of FIG. 6. As a result, the game server 202 may update the character state information of the dummy character at step S604 in similarity with updates to the character state information of the game players 104.

In additional embodiments of the present disclosure, the game server 202 may create the dummy player at step S806 in correspondence with an animate or inanimate object of the network game. For example, the game server 202 may create the dummy player in correspondence with a sun, moon, star, or bell tower. According to such an embodiment, the spectator game screen, as viewed by the dummy player, may be provided as an overhead view of the game space or game environment without requiring additional computations for determining a position of the dummy player. The game server 202 may further create the dummy player in correspondence with an object in the network game, such as an enemy character or animal. By this means, the spectator game screen may be moved within the game space or game environment while minimizing computations and maintaining a natural look and feel of the network game. An interest of the game spectators 110 will also be enhanced by providing a feeling of participation within the network game. Once again, the above examples are merely exemplary and are not limiting or exhaustive. In accordance with these embodiments, the game program may cause the game server 202 to receive information of the animate or inanimate objects as the controller input information 702 pursuant to step S602 of the game processing 600 of FIG. 6. Alternatively, the game server 202 may replicate or copy the state information of the animate or inanimate objects from processing performed pursuant to step S606 of the game processing 600 of FIG. 6.

In the above-described exemplary and non-limiting embodiments, the spectator game screen is generally managed by the game server 202 so as to be different than each player game screen of the game players 104. The spectator game screen may comprise a global view of the network game, and thus, the game spectators 110 need not specifically follow or have loyalty to any particular one of the game players 104. Thus, diversity and breadth of the game spectators 110 may be increased.

The spectator game screen may also be the same or include at least one of the player game screens of the game players 104. According to such embodiments, the game server 202 may configure the dummy player to be the same as or similar to one of the game players 104. In this regard, the game program may cause the game server 202 to receive the controller input information 702 of the one of the game players 104 as the controller input information 702 of the dummy character at S602 of the game processing 600 of FIG. 6. For example, the game program may store identification information of one of the game players 104 as identification information of the dummy player. When the controller input information 702 is received which includes the identification information, the controller input information 702 may be associated with the one of the game players 104 and also with the dummy player, with the character state information of each player being updated in step S604. As a result, redundant rendering instructions 704 may be transmitted for generating each of the player game screen of the one of the game players 104 and the spectator game screen of the game spectators 110 at S610. Accordingly, the structure or functionality of the rendering server 204 need not be modified for accommodating the spectator game screen. Alternatively, a same rendering instruction 704 may be transmitted for both of the player game screen of the one of the game players 104 and the spectator game screen of the game spectators 110 at S610. The rendering server 204 may generate a single game screen as both the player game screen of the one of the game players 104 and the spectator game screen of the game spectators 110. According to such an embodiment, a processing load on the game server 202 may be reduced via duplication.

In the embodiments of the present disclosure in which the dummy player is configured to be the same or similar to one of the game players 104, the dummy player may be fixed to the one of the game players 104 for a duration of the network game. The dummy player may be fixed to the one of the game players 104 based on a ranking of the one of the game players 104, a status or role of the one of the game players 104 in the network game, or based on any other criteria which is known and understood in the art. However, the dummy player need not be configured to be the same or similar to one of the game players 104 for an entire duration of the network game. That is, a configuration of the dummy player may switch between different game players 104, or between any of the configurations of the dummy player described herein. For example, the rendering server 204 may generate the spectator game screen as corresponding to the player game screen of one of the game players 104 for a number of frames followed by corresponding to the player game screen of another of the game players 104 for a number of frames. Accordingly, the rendering server 204 may generate a stream of spectator game screens, with the stream including player game screens of a plurality of the game players 104. The player game screens of the different game players 104 may be consecutively, sequentially, serially, or otherwise displayed in the stream. According to such embodiments, the game spectators 110 may watch or view multiple ones of the game players 104, thereby creating further appeal and interest amongst the game spectators 110.

Figure 9:
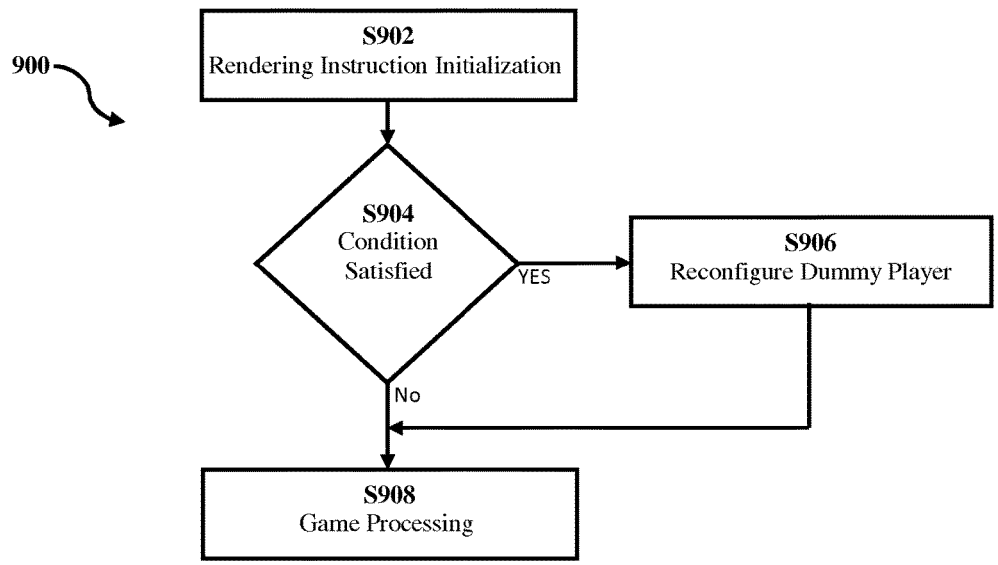
FIG. 9 illustrates a flowchart of an exemplary game process for reconfiguring a dummy player for switching a spectator game scream, according to an aspect of the present disclosure.

The game server 202 may execute game processing as generally shown at 900 in FIG. 9 to switch the spectator game screen from amongst the player game screens of the game players 104. The game server 202 undergoes a rendering instruction initialization processing at step S902. The rendering instruction initialization processing may begin in accordance with each frame, a clock-cycle, as a result of the controller input information 702 being received by the game server 202 from any one or all of the game players 104, or based on any additional or alternative criteria. For example, in an embodiment of the disclosure in which the spectator game screen switches from corresponding to a first one of the game players 104 to a second one of the game players 104, the game server 202 may execute the game processing 900 of FIG. 9 when the controller input information 702 is received from either or both of the first and second ones of the game players 104.

After initialization, the game server 202 determines whether a condition is satisfied at step S904. The condition may be related to either or both of the first and second ones of the game players 104, or related to a state or event of the network game. For example, the condition may include either of the first and second ones of the game players 104 engaging in a predetermined event during the network game, such as a battle or conversation. The condition may also include a status of a player character of either of the first and second ones of the game players 104 being in a predetermined state, such as incurring damage or being below a threshold. Of course, these examples are merely exemplary and are not limiting or exhaustive.

If the condition is satisfied, the game server 202 may reconfigure or modify the settings of the dummy player or fake client which is not controlled by any of the game players 104 at step S906. For example, the game server 202 may reconfigure the dummy player in the database to correspond to the second one of the game players 104 instead of the first one of the games players. Thereafter, game processing of the network game is resumed at step S908 in accordance with normal game processing, for example, as described with respect to FIG. 6.

While the game processing 900 of FIG. 9 has been described with respect to switching the spectator game screen from amongst the player game screens of the game players 104, it should be understood that the spectator game screen may be switched amongst any of the embodiments of the dummy player as described herein. Moreover, while the spectator game screen has been described as being switched between two different screens, it should also be understood that the spectator game screen may be switched amongst any number of screens.

The rendering server 204 transmits the generated spectator game screen to the broadcaster 206 as rendering server broadcast information 710. The broadcaster 206 receives the rendering server broadcast information 710, processes, encodes, and/or compresses the information, and transmits the resultant data to the display interface 108 as broadcaster information 712. The broadcaster information 712 may include only the rendering server broadcast information 710 received from the rendering server 204. Alternatively, the broadcaster 206 may also receive game server broadcast information 714 from the game server 202. The game server broadcast information 714 may include, for example, audio information of the network game. In this regard, the broadcaster 206 may receive video information from the rendering server 204 as the rendering server broadcast information 710, and receive audio information from the game server 202 as the game server broadcast information 714. The broadcaster 206 may merge the video information and the audio information in accordance with any known and understood methods or protocols. For example, the broadcaster 206 may merge the video information and the audio information in accordance with real time messaging protocol (RTMP), and transmit the resultant audio and visual stream to the display interface 108 as the broadcaster information 712.

The display interface 108 receives the broadcaster information 712 from the broadcaster 206, and makes the information available to the game spectators 110 as a broadcast stream 716 of the network game. In other words, the display interface 108 has a functionality of distributing the broadcast stream 716 to the game spectators 110. The display interface 108 may comprise a single distribution interface, or the display interface 108 may comprise multiple distribution interfaces which comprise a content distribution or delivery network.

The display interface 108 may provide the broadcast stream 716 to the game spectators 110 via any known and understood methods. For example, the display interface 108 may include a website or portal which the game spectators 110 may access via the network 106 for viewing the broadcast stream 716. In this regard, the display interface 108 may live-stream the broadcast stream 716. Additionally or alternatively, the display interface 108 may provide the broadcast stream 716 as a downloadable object. In any event, the display interface 108 provides a medium for broadcasting the network game to the game spectators 110, and may include any known content distribution network, system, server, or application which provides the broadcast stream 716 in accordance with any known protocol, format, or standard.

The broadcast system 700 has generally been described herein as providing the spectator game screen as a single content source for the broadcaster 206. That is, the rendering server broadcast information 710 has generally been described as including a single spectator game screen for each frame of the network game. In such embodiments, the broadcaster 206 may be configured to receive and broadcast a single video source, whereupon the broadcast stream 716 solely includes the spectator game screen as a video source. However, in alternative embodiments of the present disclosure as shown in FIG. 10, for example, the broadcaster 206 may be configured to receive multiple video sources for output in the broadcast stream 716.

Figure 10:
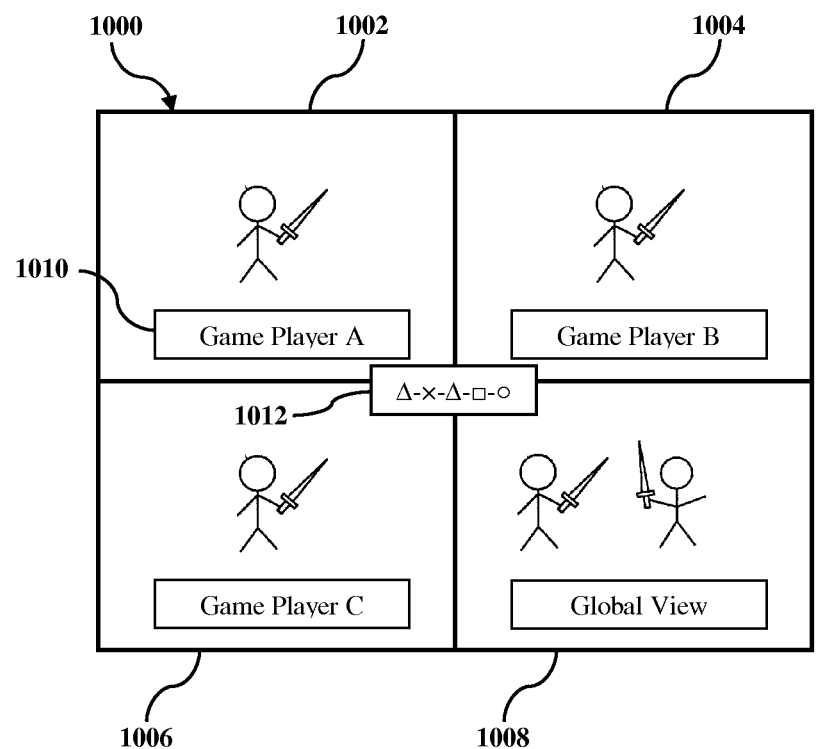
FIG. 10 illustrates a schematic of an exemplary broadcast stream, according to an aspect of the present disclosure.

The broadcast stream 716 of FIG. 10 is generally indicated at 1000 and includes four video sources 1002, 1004, 1006, 1008. The video sources 1002, 1004, 1006, 1008 may correspond to different ones of the game players 104 or any of the other embodiments of the spectator game screen described herein. In this regard, the game server 202 may manage a separate dummy player or fake client for each of the video sources 1002, 1004, 1006, 1008, and the rendering server broadcast information 710 may comprise four spectator game screens which are separately generated by the rendering server 204 for each frame of the network game. The rendering server 204 may generate each of the spectator game screens in accordance with any of the embodiments described herein, including the game processing 900 as generally shown in FIG. 9. The broadcaster 206 may receive the spectator game screens and compile or combine the multiple spectator game screens as the broadcaster information 712 for display by the display interface 108 as the single broadcast stream 716. While FIG. 10 shows four video sources 1002, 1004, 1006, 1008, it should be appreciated that additional embodiments of the present disclosure may include any number of video sources.

Accordingly, the rendering server broadcast information 710 which is generated by the rendering server 204 and transmitted to the broadcaster 206 and display interface 108 for broadcasting to the game spectators 110 is not limited to a single video source, or to a single spectator game screen for each frame of the network game. The rendering server broadcast information 710 may include a plurality of spectator game screens which are generated for a frame of the network game. Moreover, while the game server broadcast information 714 is described above as including audio information, the game server broadcast information 714 is not limited to including audio information and may additionally or alternatively include any game data. For example, the game server broadcast information 714 may include menu data for the game players 104 or for a status of the network game. FIG. 10 shows menu data 1010 as being included for each of the video sources 1002, 1004, 1006, 1008. The broadcaster 206 may be configured to receive the menu data 1010 from the game server 202 as the game server broadcast information 714, and to superimpose the menu data onto any of the video sources 1002, 1004, 1006, 1008. Alternatively, the broadcaster 206 may be configured to receive the menu data as additional data or video sources. In this regard, an output format of the broadcaster 206 may be configured to include any combination and configuration of data and video source inputs from the game server 202 and the rendering server 204.

The game server broadcast information 714 is also not limited to including menu data for the game players 104 or status information of the network game. In further embodiments of the present disclosure, the game server broadcast information 714 may include the operation input of any of the game players 104, as generally received at step S602 of FIG. 6. In other words, the game server broadcast information 714 may include the controller input information 702 of the game players 104. The game server broadcast information 714 may even include dummy or fake controller inputs for the dummy player or fake client which are managed by the game server 202 for moving the dummy player or fake client in the game space or game environment. As a result, the broadcast system 700 may function as a learning or teaching tool for instructing the game spectators 110 how to play the network game.

The broadcast system 700 may display the controller inputs for any one of the players of the network game in the broadcast stream 716, or for any combination of players of the network game. The broadcast system 700 may further switch amongst the game players 104 for displaying the controller inputs in the broadcast stream 716. For example, the game server 202 may transmit an operational input for one of the game players 104 as the game server broadcast information 714 for display in the broadcast stream 716. Thereafter, in response to a predetermined event occurring in the network game, the game server 202 may transmit an operational input for another one of the game players 104 as the game server broadcast information 714 for display in the broadcast stream 716. The predetermined event may include for example, one of the game players 104 executing an attack, performing a combination, performing a finishing move, or any other event which may occur in a network game. According to such embodiments, the controller inputs may be displayed in the broadcast stream 716 for events which are most likely of interest to the game spectators 110.

The broadcaster 206 may be configured to receive the controller inputs from the game server 202 as the game server broadcast information 714, and to superimpose the menu data onto any of the video sources 1002, 1004, 1006, 1008 of FIG. 10. Alternatively, the broadcaster 206 may be configured to receive the menu data as additional data or video sources. In this regard, the broadcaster 206 may again be configured to include any combination and configuration of data and video source inputs from the game server 202 and the rendering server 204. For example, FIG. 10 is shown as including a controller input source at 1012. The controller input source 1012 may identify or be associated with the one of the game players 104 to which the controller input source 1012 corresponds. Alternatively, the controller input source 1012 may be displayed without association or anonymously. Moreover, while a single controller input source 1012 is shown in FIG. 10, it should be understood that multiple controller input sources may also be included within the broadcast stream 716.

Any of the above-mentioned rendering server broadcast information 710 and game server broadcast information 714 may be configured to be freely available to all game spectators 110 in the broadcast stream 716. That is, the broadcaster 206 and the display interface 108 may be configured to freely display each of the data and video source inputs to all of the game spectators 110. However, in further embodiments of the present disclosure, any of the data and video source inputs may require that a condition be satisfied before being displayed by the display interface 108 to the game spectators 110. For example, the display interface 108 may require that the game spectators 110 complete an authentication or log-in process before displaying certain ones of the data and video source inputs of the broadcast stream 716. Additionally or alternatively, the display interface 108 may require that the game spectators 110 submit a payment or complete a task before certain ones of the data and video source inputs of the broadcast stream 716 are displayed. In other words, any combination of the data and video source inputs of the broadcast stream 716 described herein may be displayable to or viewable by less than all of the game spectators 110.

Figure 11:
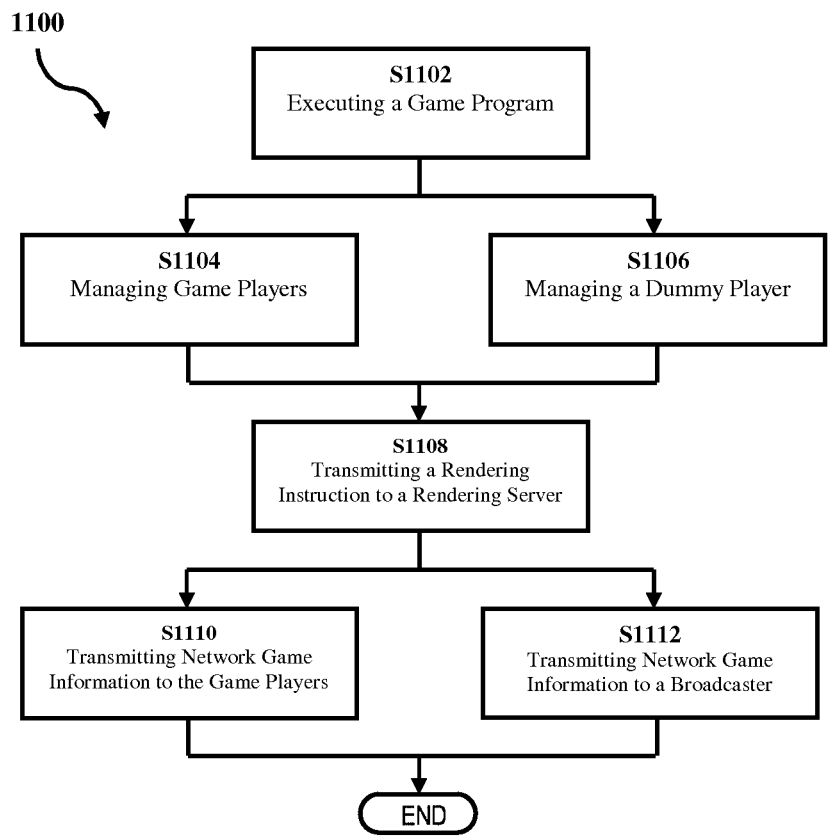
FIG. 11 illustrates an exemplary method of a game server of a broadcast system for broadcasting a network game to a plurality of game spectators, according to an aspect of the present disclosure.
Figure 12:
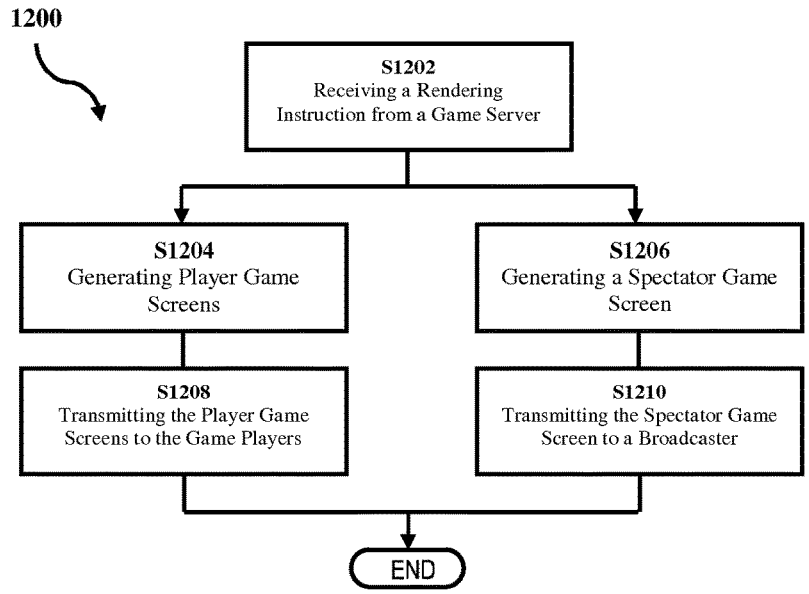
FIG. 12 illustrates an exemplary method of a rendering server of a broadcast system for broadcasting a network game to a plurality of game spectators, according to an aspect of the present disclosure.
Figure 13:
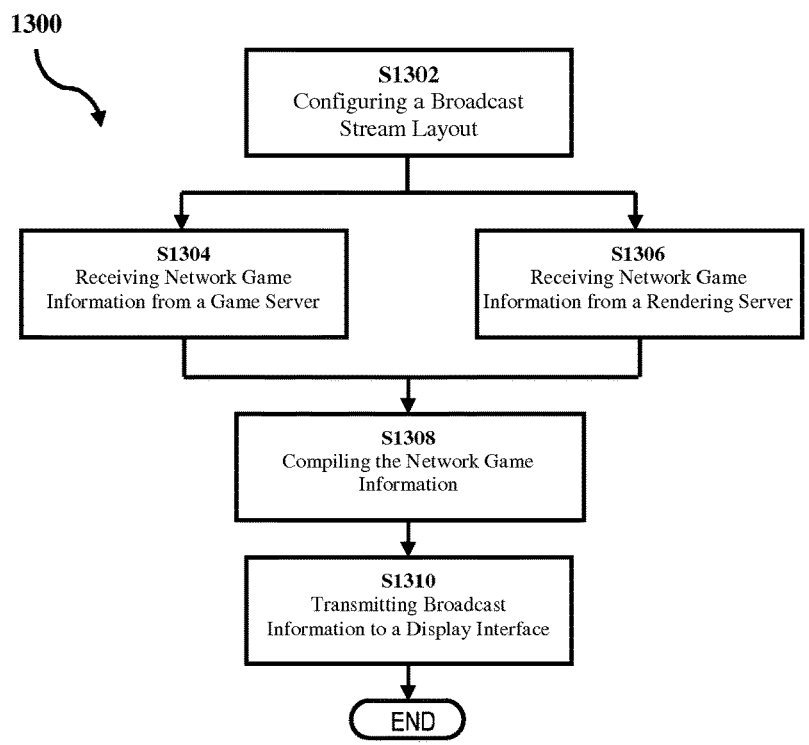
FIG. 13 illustrates an exemplary method of a broadcaster of a broadcast system for broadcasting a network game to a plurality of game spectators, according to an aspect of the present disclosure.

According to further embodiments of the present disclosure, as shown by FIGS. 11-13, various methods for broadcasting a network game to a plurality of game spectators are provided. The methods may be computer-implemented or implemented in accordance with any other known hardware or software which is capable of executing a set of instructions, steps, or features, sequentially or otherwise.

FIG. 11 shows an exemplary method of the game server 202 of FIG. 7. The method is generally shown at 1100. The game server 202 executes a game program at step S1102. The game server 202 may execute the game program, for example, when the network game begins, when the game server 202 is activated, or when the controller input information 702 is received. The game server 202 manages game player information at step S1104. The game server 202 may create or update the game player information in accordance with the game processing 600 of FIG. 6, or in accordance with any of the other embodiments described herein. The game server 202 further manages dummy player information at step S1106. The game server 202 may create the dummy player information in accordance with the game process 800 of FIG. 8, update the dummy player information in accordance with the game process 600 of FIG. 6, reconfigure the dummy player information in accordance with the game process 900 of FIG. 9, or manage the dummy player information in accordance with any of the other embodiments described herein. The game server 202 generates and transmits the rendering instruction 704, including game information on a progress of the network game, to the rendering server 204 at step S1108. The game information may include the managed game player information, the managed dummy player information, and/or any additional information. The game server 202 transmits network game information to the game players 104 at step S1110, and transmits network game information to the broadcaster 206 at step S1112. The game server 202 may transmit the network game information to the game players 104 and the broadcaster 206 in response to receiving a confirmation from the render server 204 or in accordance with any additional criteria. The network game information which is transmitted to the game players 104 at step S1110 may include, for example, the audio information 708 as described with respect to FIG. 7. Moreover, the network game information which is transmitted to the game broadcaster 206 at step S1112 may include, for example, the game server broadcast information 714 as described with respect to FIG. 7. Thereafter, processing may end or be restarted. The processing may, for example, be executed each frame of the network game. Of course, the method of FIG. 11 is merely exemplary and may additionally or alternatively include any of the features described with respect to the game server 202 herein.

FIG. 12 shows an exemplary method of the rendering server 204 of FIG. 7. The method is generally shown at 1200. The rendering server 204 receives the rendering instruction 704, including the game information, at step S1202. The rendering server 204 generates the player game screens at step S1204, and generates the spectator game screen at step S1206. The rendering server 204 may generate the player game screens and the spectator game screen in accordance with any of the embodiments described herein. The rendering server 204 transmits the player game screens to the game players 104 at step S1208, and transmits the spectator game screen to the broadcaster 206 at step S1210. Thereafter, processing may end or be restarted. The processing may, for example, be executed each frame of the network game. Of course, the method of FIG. 12 is merely exemplary and may additionally or alternatively include any of the features described with respect to the rendering server 204 herein.

FIG. 13 shows an exemplary method of the broadcaster 206 of FIG. 7. The method is generally shown at 1300. The broadcaster 206 may initially be configured to define a broadcast stream layout including any combination of audio, data, and video sources at step S1302. The broadcaster 206 receives network game information from the game server 202 at step S1304, and receives network game information from the rendering server 204 at step S1304. The network game information which is received from the game server 202 at step S1304 may include, for example, the gamer server broadcast information 714 as described with respect to FIG. 7. Moreover, the network game information which is transmitted from the rendering server 204 at step S1306 may include, for example, the rendering server broadcast information 710 as described with respect to FIG. 7. The broadcaster 206 compiles the network game information received from the game server 202 and the rendering server 204 at step S1308, and transmits broadcast information, such as the network game broadcast information 712 as described with respect to FIG. 7, to the display interface 108 at step S1310. Thereafter, processing may end or be restarted. The processing may, for example, be executed each frame of the network game. Of course, the method of FIG. 13 is merely exemplary and may additionally or alternatively include any of the features described with respect to the broadcaster 206 herein.

Although systems, methods, and media for broadcasting a network game to a plurality of game spectators have been described with reference to several exemplary embodiments, it is understood that the words that have been used are words of description and illustration, rather than words of limitation. Changes may be made within the purview of the appended claims, as presently stated and as amended, without departing from the scope and spirit of the systems, methods, and media for broadcasting a network game to a plurality of game spectators in their aspects.

Although systems, methods, and media for broadcasting a network game to a plurality of game spectators have been described with reference to particular means, materials and embodiments, the systems, methods, and media are not intended to be limited to the particulars disclosed; rather the systems, methods, and media for broadcasting a network game to a plurality of game spectators extend to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an," "the," etc. is not to be construed as limiting the element to the singular.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for broadcasting a network game to a plurality of game spectators, the system comprising:
    a game server that executes a game program and generates game information for progressing the network game, a plurality of game players being connected to the game server for participating in the network game;
    a rendering server that receives the game information from the game server, renders a player game screen for each of the plurality of game players, and renders a spectator game screen for the plurality of game spectators, the player game screen being transmitted to each of the plurality of game players for display by the plurality of game players, the spectator game screen not being directly or indirectly transmitted to any of the plurality of game players; and
    software that, when executed by a processor, causes the processor to receive the spectator game screen directly from the rendering server and transmit the spectator game screen to a display interface via a network, the display interface being accessible by each of the plurality of game spectators for viewing the spectator game screen without viewing any one player game screen,
    wherein the player game screen is transmitted to first client devices corresponding to the plurality of game players, the display interface is accessible by second client devices corresponding to the plurality of game spectators, and the software is separate from the first client devices and the second client devices,
    the spectator game screen, which is rendered by the rendering server, is different than each player game screen which is rendered for the plurality of game players, and
    the game information includes information of a dummy player which is not controlled by a participant in the network game, and the rendering server renders the spectator game screen for the dummy player.

2. The system according to claim 1, wherein the spectator game screen is a global view different than the player game screen of each of the plurality of game players.

3. The system according to claim 1, wherein the player game screen is different for each of the plurality of game players.

4. The system according to claim 1, wherein
    the spectator game screen comprises player game screens of at least two of the plurality of game players.

5. The system according to claim 4, wherein the player game screens of the at least two of the plurality of game players are displayed consecutively.

6. The system according to claim 1, wherein
    the rendering server renders a plurality of spectator game screens for a frame of the network game and transmits the plurality of spectator game screens to the processor, and
    the software, when executed by the processor, causes the processor to transmit the plurality of spectator game screens to the display interface, the display interface being accessible by each of the plurality of game spectators for simultaneously viewing the plurality of game screens of the frame of the network game.

7. The system according to claim 1, wherein
    the game server transmits game data to the processor, and
    the processor receives the game data from the game server and transmits the game data to the display interface via the network for display with the spectator game screen.

8. The system according to claim 7, wherein the game data comprises controller inputs of at least one of the plurality of game players.

9. The system according to claim 8, wherein
    the software, when executed by the processor, causes the processor to transmit the game data for one of the plurality of game players to the display interface via the network for display with the spectator game screen, and
    the software, when executed by the processor, causes the processor to transmit the game data for another of the plurality of game players to the display interface via the network for display with the spectator game screen in response to a predetermined event occurring in the network game.

10. The system according to claim 7, wherein the game data is accessible to less than all of the plurality of game spectators which view the spectator game screen.

11. The system according to claim 7, wherein the game data comprises audio data.

12. A method for broadcasting a network game to a plurality of game spectators, the method comprising:
    executing, by a game server, a game program for progressing the network game, a plurality of game players being connected to the game server for participating in the network game;
    generating, by the game server, game information on a progress of the network game and transmitting the game information to a rendering server;
    receiving, by the rendering server, the game information and rendering a player game screen for each of the plurality of game players based on the game information, the player game screen being transmitted to each of the plurality of game players for display by the plurality of game players;
    rendering, by the rendering server, a spectator game screen for the plurality of game spectators and transmitting the spectator game screen to a processor, the spectator game screen not being directly or indirectly transmitted to any of the plurality of game players; and
    receiving, by the processor and directly from the rendering server, the spectator game screen and transmitting the spectator game screen to a display interface via a network, the display interface being accessible by each of the plurality of game spectators for viewing the spectator game screen without viewing any one player game screen,
    wherein the player game screen is transmitted to first client devices corresponding to the plurality of game players, the display interface is accessible by second client devices corresponding to the plurality of game spectators, and the processor is separate from the first client devices and the second client devices,
    the spectator game screen, which is rendered by the rendering server, is different than each player game screen which is rendered for the plurality of game players, and
    the game information includes information of a dummy player which is not controlled by a participant in the network game, and the rendering server renders the spectator game screen for the dummy player.

13. The method according to claim 12, wherein the spectator game screen is a global view different than the player game screen of each of the plurality of game players.

14. The method according to claim 12,
wherein the spectator game screen comprises player game screens of at least two of the plurality of game players.

15. A non-transitory computer-readable medium including a program for broadcasting a network game to a plurality of game spectators, the program, when executed by at least one processor, causing the at least one processor to perform operations comprising:
    executing, by a game server, a game program for progressing the network game, a plurality of game players being connected to the game server for participating in the network game;
    generating, by the game server, game information on a progress of the network game and transmitting the game information to a rendering server;
    receiving, by the rendering server, the game information and rendering a player game screen for each of the plurality of game players based on the game information, the player game screen being transmitted to each of the plurality of game players for display by the plurality of game players;
    rendering, by the rendering server, a spectator game screen for the plurality of game spectators and transmitting the spectator game screen to a processor, the spectator game screen not being directly or indirectly transmitted to any of the plurality of game players; and
    receiving, by the processor and directly from the rendering server, the spectator game screen and transmitting the spectator game screen to a display interface via a network, the display interface being accessible by each of the plurality of game spectators for viewing the spectator game screen without viewing any one player game screen,
    wherein the player game screen is transmitted to first client devices corresponding to the plurality of game players, the display interface is accessible by second client devices corresponding to the plurality of game spectators, and the processor is separate from the first client devices and the second client devices,
    the spectator game screen, which is rendered by the rendering server, is different than each player game screen which is rendered for the plurality of game players, and
    the game information includes information of a dummy player which is not controlled by a participant in the network game, and the rendering server renders the spectator game screen for the dummy player.

16. The non-transitory computer-readable medium according to claim 15, wherein the spectator game screen is a global view different than the player game screen of each of the plurality of game players.

17. The non-transitory computer-readable medium according to claim 15,
wherein the spectator game screen comprises player game screens of at least two of the plurality of game players.

* * * * *